US008843736B2

(12) United States Patent
Pedlow et al.

(10) Patent No.: US 8,843,736 B2
(45) Date of Patent: Sep. 23, 2014

(54) AUTHENTICATION AND AUTHORIZATION FOR INTERNET VIDEO CLIENT

(75) Inventors: Leo Pedlow, Ramona, CA (US); Brant Candelore, San Diego, CA (US)

(73) Assignee: Sony Corporation, Tokyo (JP)

(*) Notice: Subject to any disclaimer, the term of this patent is extended or adjusted under 35 U.S.C. 154(b) by 706 days.

(21) Appl. No.: 12/782,174

(22) Filed: May 18, 2010

(65) Prior Publication Data
US 2011/0276797 A1 Nov. 10, 2011

Related U.S. Application Data

(60) Provisional application No. 61/330,993, filed on May 4, 2010, provisional application No. 61/331,092, filed on May 4, 2010.

(51) Int. Cl.
H04L 29/06 (2006.01)
H04N 21/61 (2011.01)
H04N 21/441 (2011.01)
H04N 21/4627 (2011.01)
H04N 21/858 (2011.01)
H04N 21/8352 (2011.01)
H04N 21/472 (2011.01)

(52) U.S. Cl.
CPC ....... *H04N 21/8352* (2013.01); *H04N 21/6175* (2013.01); *H04N 21/441* (2013.01); *H04N 21/4627* (2013.01); *H04L 63/0823* (2013.01); *H04N 21/8586* (2013.01); *H04L 63/0807* (2013.01); *H04L 63/166* (2013.01); *H04N 21/47211* (2013.01); *H04L 63/0869* (2013.01); *H04L 63/101* (2013.01)
USPC ......................................................... 713/151

(58) Field of Classification Search
USPC ......................................................... 713/151
See application file for complete search history.

(56) References Cited

U.S. PATENT DOCUMENTS

| 6,374,402 | B1 | 4/2002 | SWchmeidler et al. |
| 7,380,280 | B2 | 5/2008 | De Jong |
| 7,454,622 | B2 | 11/2008 | Laidlaw et al. |

(Continued)

FOREIGN PATENT DOCUMENTS

| JP | 2008035108 | 2/2008 |
| WO | 2009022869 | 2/2009 |
| WO | 2009052650 | 4/2009 |
| WO | 2009057965 | 5/2009 |

OTHER PUBLICATIONS

JavaCard-based Two-Level User Key Management for IP Conditional Access Systems, Jinyoung Moon ; Jongyoul Park ; Euihyun Paik, Networks, 2007. ICON 2007. 15th IEEE International Conference.*

(Continued)

*Primary Examiner* — Harris Wang
(74) *Attorney, Agent, or Firm* — John L. Rogitz

(57) ABSTRACT

A device is enabled to display Internet TV by accessing a management server with a secret unique ID and receiving back from the server, assuming the ID is approved, a user token and a service list of content servers with knowledge of the user token. A user can select a content server which causes the device to upload its user token and in response receive a content list from the content server, from which content can be selected for display. Neither list may be modified by the device and the device can access only content on a content list.

13 Claims, 3 Drawing Sheets

(56) References Cited

U.S. PATENT DOCUMENTS

| | | | |
|---|---|---|---|
| 7,600,245 B2 | 10/2009 | Steading et al. | |
| 7,836,493 B2 | 11/2010 | Xia et al. | |
| 7,895,445 B1 | 2/2011 | Albanese et al. | |
| 7,913,309 B2 | 3/2011 | Starostin et al. | |
| 8,082,591 B2 | 12/2011 | Gu et al. | |
| 8,407,755 B2* | 3/2013 | Xiong et al. | 725/131 |
| 8,458,741 B2* | 6/2013 | Xiong et al. | 725/30 |
| 2002/0104099 A1 | 8/2002 | Novak | |
| 2003/0078842 A1 | 4/2003 | Scholten et al. | |
| 2004/0008972 A1 | 1/2004 | Haken | |
| 2004/0237100 A1 | 11/2004 | Pinder et al. | |
| 2005/0086683 A1 | 4/2005 | Meyerson | |
| 2006/0212531 A1 | 9/2006 | Kikkawa et al. | |
| 2007/0061858 A1 | 3/2007 | Ura | |
| 2007/0107019 A1* | 5/2007 | Romano et al. | 725/80 |
| 2007/0256118 A1 | 11/2007 | Nomura et al. | |
| 2008/0200148 A1 | 8/2008 | Fink | |
| 2008/0244658 A1 | 10/2008 | Chen | |
| 2008/0271159 A1 | 10/2008 | Brown et al. | |
| 2009/0007187 A1 | 1/2009 | Koul | |
| 2009/0049480 A1 | 2/2009 | Wang et al. | |
| 2009/0055877 A1* | 2/2009 | Rhim | 725/87 |
| 2009/0100147 A1* | 4/2009 | Igarashi | 709/218 |
| 2009/0113502 A1 | 4/2009 | Chen | |
| 2009/0138576 A1* | 5/2009 | Sekimoto et al. | 709/219 |
| 2009/0158330 A1 | 6/2009 | Song et al. | |
| 2009/0164786 A1 | 6/2009 | Sekimoto et al. | |
| 2009/0180614 A1 | 7/2009 | Rajagopal et al. | |
| 2009/0204986 A1 | 8/2009 | Lee et al. | |
| 2009/0210552 A1 | 8/2009 | Ozugur et al. | |
| 2009/0222874 A1 | 9/2009 | White et al. | |
| 2009/0252329 A1 | 10/2009 | Casey et al. | |
| 2009/0271826 A1 | 10/2009 | Lee | |
| 2009/0282236 A1 | 11/2009 | Hallenstal et al. | |
| 2009/0293078 A1 | 11/2009 | Pirani et al. | |
| 2010/0011391 A1 | 1/2010 | Carpenter et al. | |
| 2010/0031283 A1 | 2/2010 | Kageyama et al. | |
| 2010/0070417 A1* | 3/2010 | Flynn et al. | 705/51 |
| 2010/0080163 A1 | 4/2010 | Krishnamoorthi et al. | |
| 2010/0199341 A1* | 8/2010 | Foti et al. | 726/9 |
| 2011/0173651 A1 | 7/2011 | Perry, II | |
| 2011/0276797 A1* | 11/2011 | Pedlow et al. | 713/151 |

OTHER PUBLICATIONS

Jeffrey, Mark, et al. "Content security for IPTV." Communications Magazine, IEEE 46.11 (2008): 138-146.*

CATR/MII. "IPTV Security Requirements", International Telecommunication Union, FG IPTV-ID-0051, Jul. 10-14, 2006.

UTStarcom, "Architecture Requirement for IPTV Authentications", International Telecommunication Union, FG IPTV-ID-0073, Jul. 10-14, 2006.

True Xiong, Charels David McCoy, Viral Mehta, Leo Pedlow, Aran Sadja, "Enablement of Premium Content for Internet Video Client" related U.S. Appl. No. 12/844,312, final office action dated Apr. 25, 2013.

Ignacio Mas, Viktor Berggren, Ritiwik Jana, John Murray, Christopher V. Rice; "IPTV Session Mobility", Jun. 12, 2009.

True Xiong, Charles McCoy, Viral Mehta, Leo Pedlow, Aran Sadja, "Enablement of Premium Content for Internet Video Client" related U.S. Appl. No. 12/844,312, non-final office action dated Nov. 2, 2012.

True Xiong, Charles McCoy, Viral Mehta, Leo Pedlow, Aran Sadja, "Enablement of Premium Content for Internet Video Client" related U.S. Appl. No. 12/844,312, applicants response non-final office action filed Nov. 12, 2012.

* cited by examiner

REGISTRATION

SERVER AUTHENTICATION

SUBSEQUENT AUTHORIZATION

AUTHENTICATION AND AUTHORIZATION FOR INTERNET VIDEO CLIENT

This application claims priority from U.S. provisional applications Nos. 61/330,993 and 61/331,092, both filed May 4, 2010.

FIELD OF THE INVENTION

The present application relates generally to authentication and authorization for Internet video clients including but not limited to TVs.

BACKGROUND OF THE INVENTION

Internet access through TVs is typically provided by essentially programming the TV as though it were a computer executing a browser. Such Internet access is thus uncontrolled except as a firewall or filtering program might block certain sites.

As understood herein, uncontrolled Internet access may not be desirable in the context of a TV. A firewall or filtering program may not always be installed on the TV and even when one is installed, access remains much more uncontrolled than conventional TV programming traditionally has expected. Also, a locally installed filter can be unloaded or defeated by a user.

Accordingly, uncontrolled Internet access has several drawbacks. From a viewer's standpoint, exposure to inappropriate subject matter particularly when young viewers are watching is one concern; a much lower threshold of quality screening is another. That is, while many TV shows might not be widely considered as "quality" shows, nonetheless a TV program is usually much more selectively screened than, say, an Internet video. The expectations of TV viewers for such higher level quality screening as a consequence cannot be met by simply providing unfettered Internet access through the TV. Furthermore, TV-related entities, from content providers, manufacturers, and carriers, in most cases derive no benefit from the extension of TV to the Internet.

SUMMARY OF THE INVENTION

Accordingly, a consumer electronic (CE) device includes a housing, a display on the housing, a network interface, and a processor in the housing controlling the display and communicating with the Internet through the network interface. The processor executes logic that includes periodically contacting a management server, and sending to the management server a unique CE device ID in a secure transaction, without requiring key encryption by the processor. The processor receives from the management server a user token along with one or more service lists each of which contains a list of network addresses of approved content servers and presents a service list on the display for selection of a content server thereon. Responsive to user input indicating selection of a content server on the service list, the processor uploads though the network interface the user token to the content server selected by the user. The content server sends back a content list of content available for selection by the CE device. Responsive to user input indicating selection of a piece of content on the content list, the processor sends a signal representative thereof to the content server and responsive to receiving the piece of content from the content server, plays or makes available for presentation on the display the piece of content. Neither the content list nor service list can be modified by the CE device.

In some embodiments the processor cannot access content on the Internet other than content on the content list. The secure transaction can be a secure socket layer (SSL) transaction. The processor may verify the authenticity of the management server using a public key of a certificate authority providing a server certificate received by the processor from the management server. The user token may have an expiration time after which it is no longer accepted by content servers In another aspect, a management server has a network interface and a processor communicating with the Internet through the network interface. The processor executes logic including periodically receiving a unique ID from a CE device in a secure transaction, and responsive to a determination that the unique ID is an authorized ID, downloading to the CE device a user token along with one or more service lists each of which contains a list of network addresses of approved content servers. The user token is provided to content servers on the service list so that the content servers can check later presentation of the user token by the device against their database of authorized tokens. The service list is closed and unmodifiable by the CE device.

In another aspect, a method includes, in an audio-video presentation device, providing Internet access to one and only one management server and receiving authentication information from the management server at the device. The device provides a device-unique value to the management server in a secure fashion. The value is preloaded into the device at device creation time. Responsive to a determination by the management server that the value is valid, the server downloads to the device a user token having an expiration time which may be presenting by the device to a content server as evidence that the device is authorized to be granted access to content on the content server, such that public key processing is not required for performing the method.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
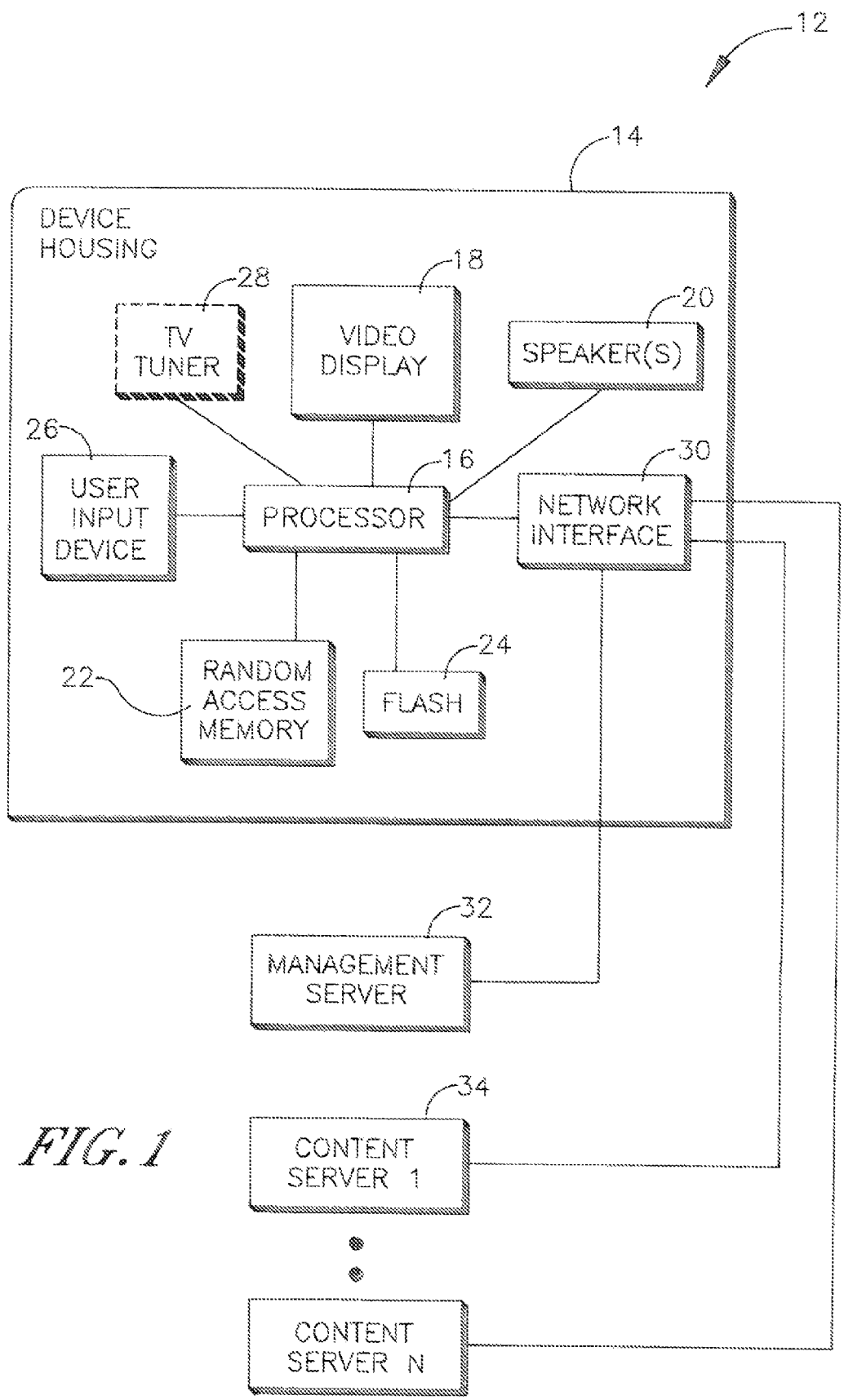
FIG. 1 is a block diagram of an example system in accordance with present principles.

Referring initially to FIG. 1, a consumer electronics (CE) device 12 such as a TV, game player, video disk player, camera, digital clock radio, mobile telephone, personal digital assistant, laptop computer, etc. includes a portable lightweight plastic housing 14 bearing a digital processor 16. The processor 16 can control a visual display 18 and an audible display 20 such as one or more speakers.

To undertake present principles, the processor 16 may access one or more computer readable storage media such as but not limited to RAM-based storage 22 (e.g., a chip implementing dynamic random access memory (DRAM)) or flash memory 24. Among other things, in example non-limiting embodiments video thumbnails may be stored on the RAM 22 while the below-described service list and tokens as well as user interface icons may be stored on the flash 24. Software code implementing present logic executable by the CE device 12 may also be stored on one of the memories shown to undertake present principles.

The processor 16 can receive user input signals from various input devices 26, including a remote control device, a point and click device such as a mouse, a keypad, etc. A TV tuner 28 may be provided in some implementations particularly when the CE device is embodied by a TV to receive TV signals from a source such as a set-top box, satellite receiver, cable head end, terrestrial TV signal antenna, etc. Signals from the tuner 28 are sent to the processor 16 for presentation on the display 18 and speakers 20.

As shown in FIG. 1, a network interface 30 such as a wired or wireless modem or wireless telephony transceiver communicates with the processor 16 to provide connectivity to a management server 32 on the Internet and to one or more content servers 34. The servers 32, 34 have respective processors. It is to be understood in view of disclosure below that the CE device 12 particularly when implemented by a non-PC device such as a TV or game console or camera can communicate only with the management server 32 and with content servers 34 that appear on a service list provided to the processor 16 by the management server 32, with the service list not being modifiable by the processor 16.

Figure 2:
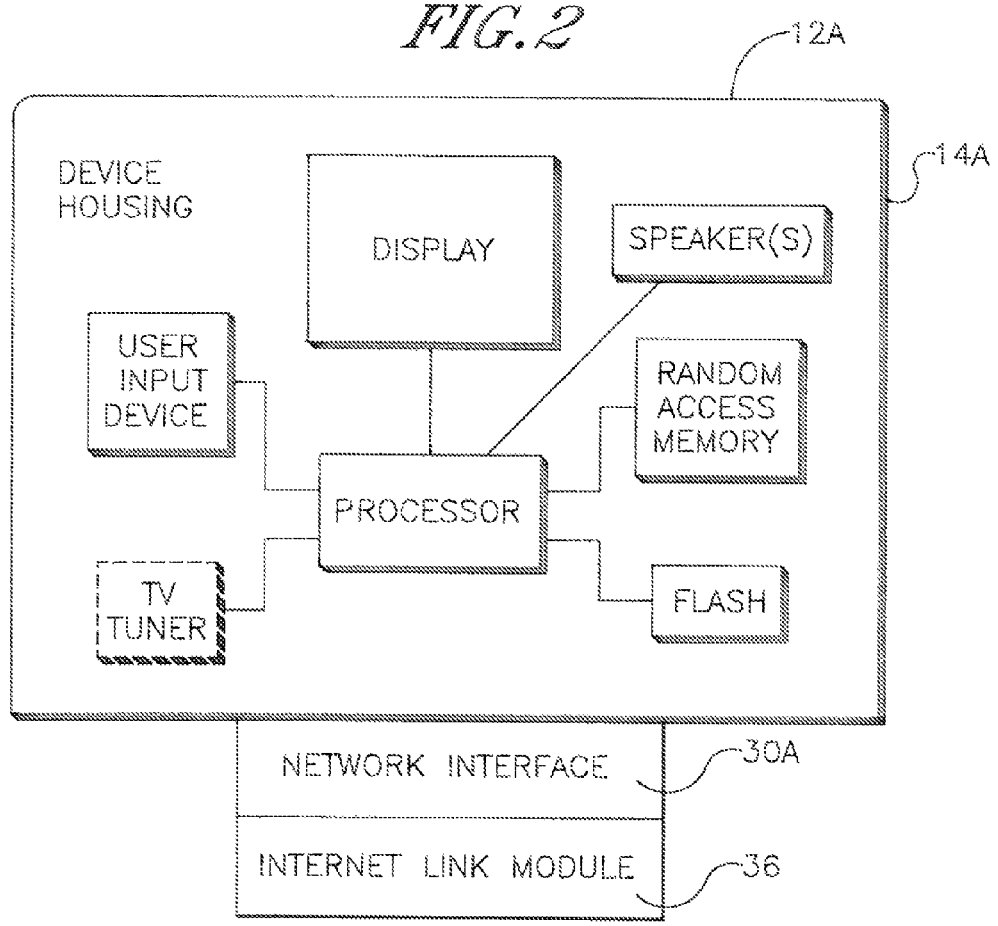
FIG. 2 is a block diagram of another example system in accordance with present principles.

FIG. 2 shows a CE device 12a that in all essential respects is identical to the device 12 shown in FIG. 1, except that a network interface 30a is not located within the device housing 14a but instead is supported in a separate Internet link module housing 36 that may be mounted on the device housing 14a.

Figure 3:
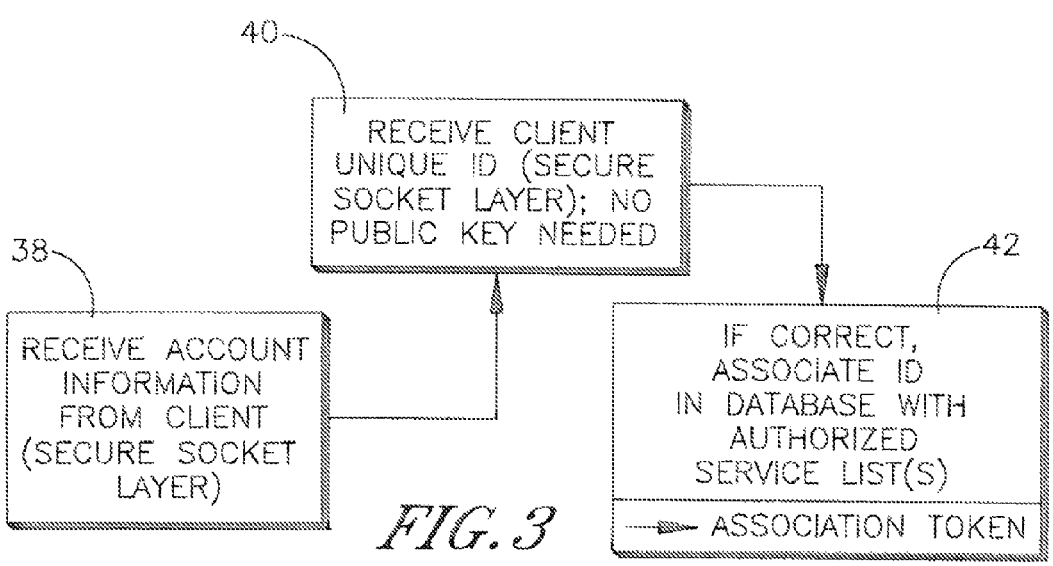
FIG. 3 is a flow chart of example registration logic according to present principles.

Now referring to FIG. 3, example registration logic can be seen. Commencing at block 38 the CE device 12 sends account information to the management server 32 preferably using a secure means of communication such as secure socket layer (SSL). Accordingly, it will be appreciated that private key-public key encryption need not be executed by the processor 16 to reduce the processing requirements thereon. The account information may include, e.g., user name and password.

At block 40, the CE device 12 sends to the management server 32 its unique identification, again using SSL so that no key encryption is required. The value of the ID can be pre-loaded at the factory or at client creation time and may be a unique "fingerprint" of the CE device 12, for example, a secret concatenation of its model number and serial number.

Moving to block 42, if the ID of the CE device is on an approved list of IDs it is associated by the management server in a database with one or more service lists that have been approved for the CE device 12. This in effect creates an "association token", which correlates the CE device ID with the approved service lists. A service list contains the network addresses of the content servers 34 that are approved for providing content to the CE device 12 and that typically are portal sites established by business partners of the provisioner of the Internet access logic or, module discussed herein. Since the portals are established by approved providers they can be designed to contain only links to approved content as discussed below and thus can be made devoid of hyperlinks to elsewhere on the Internet.

Figure 4:
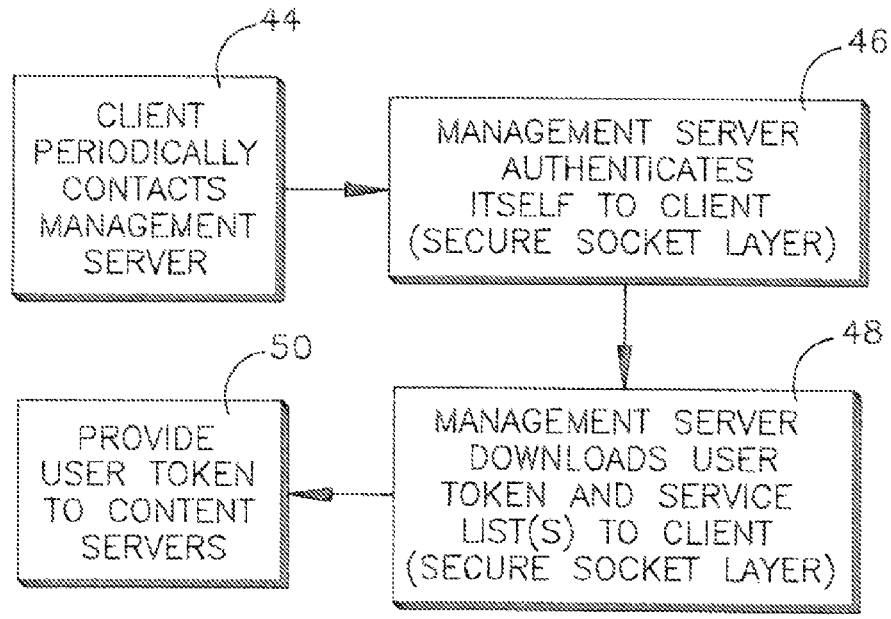
FIG. 4 is a flow chart of example authentication logic according to present principles.

Now referring to FIG. 4 for an understanding of example authentication logic, at block 44 the CE device 12 periodically checks in with the management server 32. Proceeding to block 46, the management server 32 authenticates itself to the CE device 12 so that the CE device 12 knows that it is contacting the correct server and is not being spoofed. The authentication may be undertaken using, e.g., SSL certificates. The CE device 12 can then send to the server 32 the unique CE device ID in a SSL, again without requiring key encryption of the processor 16. The CE device 12 may verify the server 32 using the public key of the certificate authority of the server certificate returned by the server 32.

Block 48 indicates that next in the logic flow, the management server 32 downloads to the CE device 12 a user token, also referred to herein as an access token or service token, along with one or more service lists each of which contains a list of network addresses of approved content servers 34. This may be done again using SSL. The user token preferably has an expiration period after which it is no longer accepted by content servers during the authorization logic discussed below. The management server 32 provides the user token along with its expiration time to the content servers 34 for purposes to be shortly disclosed.

Figure 5:
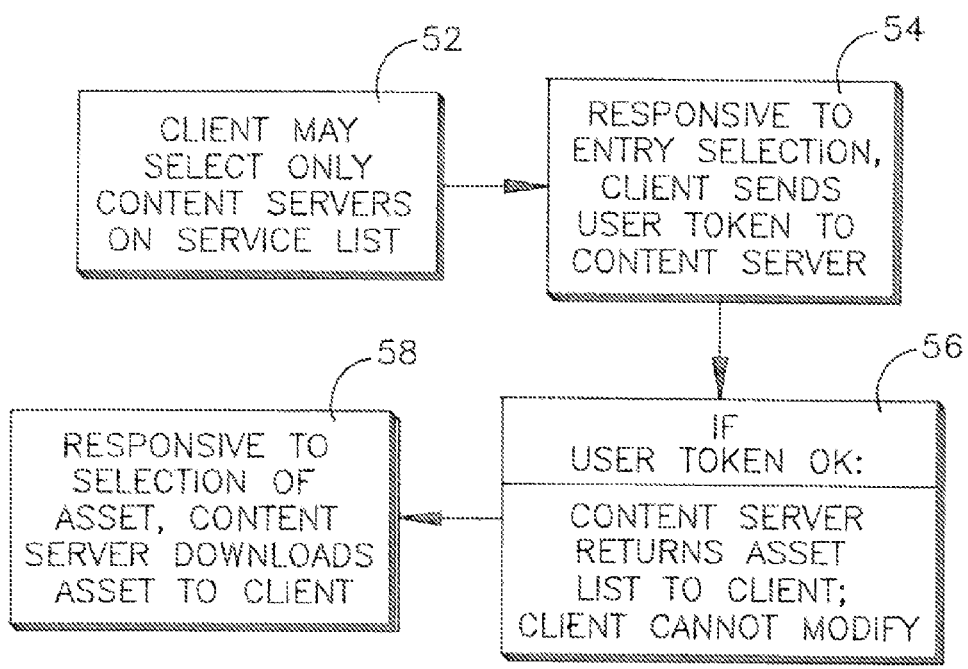
FIG. 5 is a flow chart of example authorization logic according to present principles.

The service list is typically presented by the processor 16 in a user interface (UI) presented on the display 18. The UI may simply present icons of service providers associated with the various approved content serves 34 whose network addresses can underlie the UI in the list. The UI may also present other content as desired such as the names of genres available at each content server, etc. In any case, a user of the CE device 12 may manipulate the input device 26 to select a member of the service list at block 50, which causes the processor 16 to upload, though the network interface 30, the user token to the selected content server 34 to enter the authorization logic of FIG. 5.

As discussed above, only content servers 34 on the closed and unmodifiable (except by the management server 32) service list(s) downloaded to the CE device 12 by the management server 32 can be selected by the user, as indicated at block 52. As new services (embodied by newly approved content servers 34) become available, they can be added to the service list(s) and, hence, made available across all platforms on the fly.

Recall that user tokens and their expiration times are provided by the management server to the content servers 34. Each content server 34 can then maintain a local database of active user tokens, removing each one at its respective expiration time. When a content server 34 receives a user token at block 54, it checks it against the local database of active tokens and if the user token is in the database, the logic moves to block 56 wherein the content server 34 returns a content list to the CE device 12. Thus, no further authentication is required between the CE device 12 and content server 34 beyond the provisioning of an active user token by the CE device 12. And, by virtue of the content server 34 appearing on the service list provided by the management server 32, the CE device 12 knows that it may trust the content server 34 without need for any further authentication on the part of the content server 34.

Essentially, a content list is a list of audio-video programs that the entity associated with the content server 34 has elected to make available to platforms in the Internet TV system. Like the service list, the content lists from the content servers 34 cannot be modified by the CE device 12.

Moving to block 58, the user may manipulate the input device 26 to select a program on the content list, which is then delivered, as by streaming, from the content server 34 to the CE device 12 for presentation on the display 18 and speakers 20.

Accordingly, once the CE device 12 is authenticated, the CE device 12 is delivered a "service list" from the management server. The CE device 12 is assumed to not be open, and preferably no tools are provided to allow modification of the list after it is delivered to the CE device 12. The list can be signed by the management server 32 and delivered in a unique session to a CE device 12 so that it is therefore not feasible for an eavesdropper to intercept and change or substitute the list externally. The service list is typically delivered in an encrypted channel using secure socket layer (SSL) or other secure means.

As mentioned above, the service list consists of a list of network addresses such as uniform resource locators (URLs) to service (content) providers. The CE device 12 uses the URLs listed in the service list to obtain a content list of video or audio to play. The content list may also be delivered in an encrypted channel using secure socket layer (SSL) or other secure means, and preferably it is not possible for the client to modify the URLs in the content list.

If desired, the service list URLs and the content list URLs can have tags that identify the type of CE device 12. Alternatively, as part of the authentication process, the CE device 12 may be given a Service_Token by the management server which can identify the device, to the service provider.

It will be appreciated that the mere possession of a particular URL to a service provider and user token allows access to the content. This is a desirable simplification as the fulfillment URL is that which is delivered to the CE device 12. The fulfillment URL is delivered in a secure way. In any case, present principles provide a scalable option for granting access to content on the Internet. The definition of a right to access is agreed upon by the management systems and the service providers . . . and this is manifested by a fulfillment URL.

It may also be appreciated that present principles make use of tokens to manage access of system clients to on-line services. All security operations take place at the management server to reduce opportunity to compromise the client and the system. Also, token format can be changed on-the-fly as it is not interpreted by the client devices, but rather by the content servers 34. Moreover, the Association Token stored on the management server 32 is information that can be in a content provider's own format, e.g. SAML, XACML, OpenID, or SOAP. The content provider's system for managing identities and access thus does not need to change.

User tokens are created for authenticated client devices by the management server 32. The user tokens can be used for client sessions of any desired duration owing to their expiration times, which can be established as desired. The CE device 12 establishes its identity through the use of a secret and unique device ID. This ID is protected and only used when authenticating with the management server 32. All communication between the client device and server can be encrypted using SSL. Upon receipt of a valid ID, the management server 32 returns a temporal user token that will expire in a specified amount of time. The user token is passed to third party services, e.g. content providers associated with the content servers 34, with information that will not change during the session period. If desired, language, parental rating limit, link speed, account affiliation, country, and zipcode can be included in the user token. The user token may be signed using a keyed hash.

In addition to providing user tokens, the management server 32 delivers service lists to client devices. These service lists may be different depending on the location of the particular client device 12 to which they are sent by geo-filtering, e.g., some content might not be allowed outside of America and hence would not be included on either a service list (if the entire content server 34 is to be off-limits) or a content list (if only some content proposed to be provided through a content server 34 is to be off-limits). Other filtering may be by parental rating, e.g., adult channels may be omitted from some lists but not others.

Because a service list may be similar to other service lists, a service definition entity may opt to send to the management server a service list number instead of the list itself, which would require the entity to have defined the service list previously with the management server 32. There can be any number of service lists associated with the tiers of service that a service definition entity wishes to enable. For example, there may be fifteen service lists. Some service lists may be supersets of other lists. However, some service lists may be niche or a-la-carte programming sold individually. A device 12 may therefore have access to multiple service lists. A device might have access to a premium list of channels, e.g., "Service List Number 5", and also to a service list containing twenty five basic channels, e.g., "Service List Number 12". The management server 32 associates the client device 12 with a certain account (handled by the association token) and then the services which can be enumerated as "5" and "12". If it is desired to allow a device 12 access to the basic channels, then only "12" would be enumerated.

In some implementations, when a client device 12 accesses a content server 34, it provides the user token which can be used by the content server 34 in a B2B transaction to query the management server 32 to determine whether the client device 12 is allowed to get access to that content. But this transaction is not necessary for some client devices since a client device receives the service list in an SSL session and per the robustness rules safeguards the list from manipulation. Thus, if a client device 12 has the URL for the content and has a valid user token, then the client device is assumed to be authorized.

If additional authorization is required, the query to the management server 32 may include the exact URL of the website being accessed. The management server 32 looks for the exact URL in the service lists linked to the subject client. If the URL is found, then the client device is designated as authorized. If not, then the client device is designated as not authorized. In the previous example, this would allow the management server 12 to examine service lists "5" and "12" to see if the device was enabled for that content. The content provider can store a service token (cookie) in the client device 12. If the client device 12 revisits the content server in the future, the service token can be examined and if present precludes the need for checking authorization status. Upon authorization the content server 34 delivers a content list to the client device 12 which lists content available to that particular client device on the content server 34. As an alternative to the management server 32 verifying authorization status, the management server 32 may forward the query from the content server 34 back to the service definition entity after appending the association token to the query from the content server 34.

The client device 12 periodically accesses the management server 32 to obtain an updated signed user token and service list. The interval at which a device 12 returns to the server 32 is programmable. And because it is a "pull" model, the management server 32 need only be contacted once to get the update.

The management server 32 can add or delete access to services through the service list which is uploaded by the service definition entity. The service list can identically match the tier of service that a subscriber has with an individual service definition entity.

Furthermore, because the device 12 can be linked to a billing system or wallet for transactions, video on demand (VOD) services are enabled. The billing account association does not interfere with the underlying business rules of the original account.

Also, the client device 12 can provide a reportback feature which can support confirmation that ads have been rendered on-screen to support an advertising based business model. Communication between the management server 32 and device 12 may be performed using HTTPS. The server verifies the client's secret ID. As between the client device 12 and content servers 34, communication may also be performed using HTTPS. The client verifies the content server 34 using the public key of the certificate authority of the server certificate, while the content server 34 verifies the client's secret User Token.

If a client device 12 does not have a user token or the user token is not to be trusted for some reason (insecure platform), the programmer can query the management server 12 to see if the client has the rights to the content. Since the management server 32 knows about the service lists sent to the client device 12 it can do this on its own. To determine whether a particular asset is allowed, the programmer can retrieve the service token was placed in the client device after the user token was received and validated. It can verify this token by itself. The token can be valid for any desired period of time.

While the particular AUTHENTICATION AND AUTHORIZATION FOR INTERNET VIDEO CLIENT is herein shown and described in detail, it is to be understood that the subject matter which is encompassed by the present invention is limited only by the claims.

What is claimed is:

1. A Consumer electronic (CE) device comprising:
a display;
a network interface;
a processor configured for controlling the display and communicating with the Internet through the network interface;
the processor programmed for executing logic including:
registering with a management server at least in part by sending to the management server a unique CE device identification (ID) in a secure transaction;
subsequent to registering with the management server and prior to a user request for content using the CE device, periodically contacting the management server to establish periodic contacts therewith;
during each periodic contact, after receiving correct authentication information from the management server ensuring the CE device is not being spoofed, sending to the management server the unique CE device ID in a secure transaction, responsive to successful authentication with the management server each periodic contact, receiving from the management server a user token along with one or more service lists each of which contains a list of network addresses of approved content servers such that the service list is configured to be updated and provided by the management server to the CE device each periodic contact without a user of the CE device requesting an updated service list of content from a content server on the service list;
presenting a service list on the display for selection of a content server thereon;
responsive to user input indicating selection of a content server on the service list, uploading, though the network interface, the user token to the content server selected by the user;
receiving from the content server a content list of content available for selection by the CE device;
responsive to user input indicating selection of a piece of content on the content list, sending a signal representative thereof to the content server; and responsive to receiving the piece of content from the content server, playing or making available for presentation on the display the piece of content, wherein neither the content list nor service list can be modified by the CE device.

2. The CE device of claim 1, wherein the processor cannot access content on the Internet other than content on the content list.

3. The CE device of claim 1, wherein the secure transaction is a secure socket layer (SSL) transaction.

4. The CE device of claim 1, wherein the processor is configured to verify authenticity of the management server using a public key of a certificate authority providing a server certificate received by the processor from the management server.

5. The CE device of claim 1, wherein the user token has an expiration time after which it is no longer accepted by content servers 6. A Method comprising:
registering with a management server at least in part by sending to the management server a unique Consumer electronic (CE) device identification (ID) in a secure transaction;
subsequent to registering with the management server and prior to a user request for content using the CE device, periodically contacting the management server to establish periodic contacts therewith;
during each periodic contact, after receiving correct authentication information from the management server ensuring the CE device is not being spoofed, sending to the management server the unique CE device ID in a secure transaction;
responsive to successful authentication with the management server each periodic contact, receiving from the management server a user token along with one or more service lists each of which contains a list of network addresses of approved content servers such that the service list can be updated and provided by the management server to the CE device each periodic contact without a user of the CE device requesting an updated service list of content from a content server on the service list;
presenting a service list on a display for selection of a content server thereon;
responsive to user input indicating selection of a content server on the service list, uploading, though the network interface, the user token to the content server selected by the user;
receiving from the content server a content list of content available for selection by the CE device;
responsive to user input indicating selection of a piece of content on the content list, sending a signal representative thereof to the content server; and
responsive to receiving the piece of content from the content server, playing or making available for presentation on the display the piece of content, wherein neither the content list nor service list is configured to be modified by the CE device.

7. The method of claim 6 wherein the management server is authenticated using a secure socket layer (SSL) certificate.

8. The method of claim 6 wherein the secure fashion uses secure socket layer (SSL).

9. The method of claim 6, wherein responsive to a determination that the value is valid, the management server delivers a list of content servers to the device, the device being programmed to access only content servers on the list and no other assets on the Internet.

10. The method of claim 9, wherein the device cannot modify the list.

11. The method of claim 9, wherein the list is signed by the management server and delivered in a unique session to the device such that it is not feasible to intercept and change or substitute the list externally.

12. The method of claim 9, wherein the list is delivered to the device in an encrypted channel.

13. The method of claim 9, wherein a mere presentation of the token to an asset server allows access by the device to content on a content list returned to the device by the content server.

* * * * *